(No Model.) 4 Sheets—Sheet 1.

E. B. MANSFIELD.
MACHINE FOR MAKING PARTS OF PIANOFORTE ACTIONS.

No. 507,020. Patented Oct. 17, 1893.

WITNESSES: INVENTOR:

(No Model.) 4 Sheets—Sheet 3.

E. B. MANSFIELD.
MACHINE FOR MAKING PARTS OF PIANOFORTE ACTIONS.

No. 507,020. Patented Oct. 17, 1893.

WITNESSES:
M. W. Jackson
H. A. Hall

INVENTOR:
E. B. Mansfield
by Knight, Brown & Crossley
Solicitors.

(No Model.) 4 Sheets—Sheet 4.
E. B. MANSFIELD.
MACHINE FOR MAKING PARTS OF PIANOFORTE ACTIONS.
No. 507,020. Patented Oct. 17, 1893.
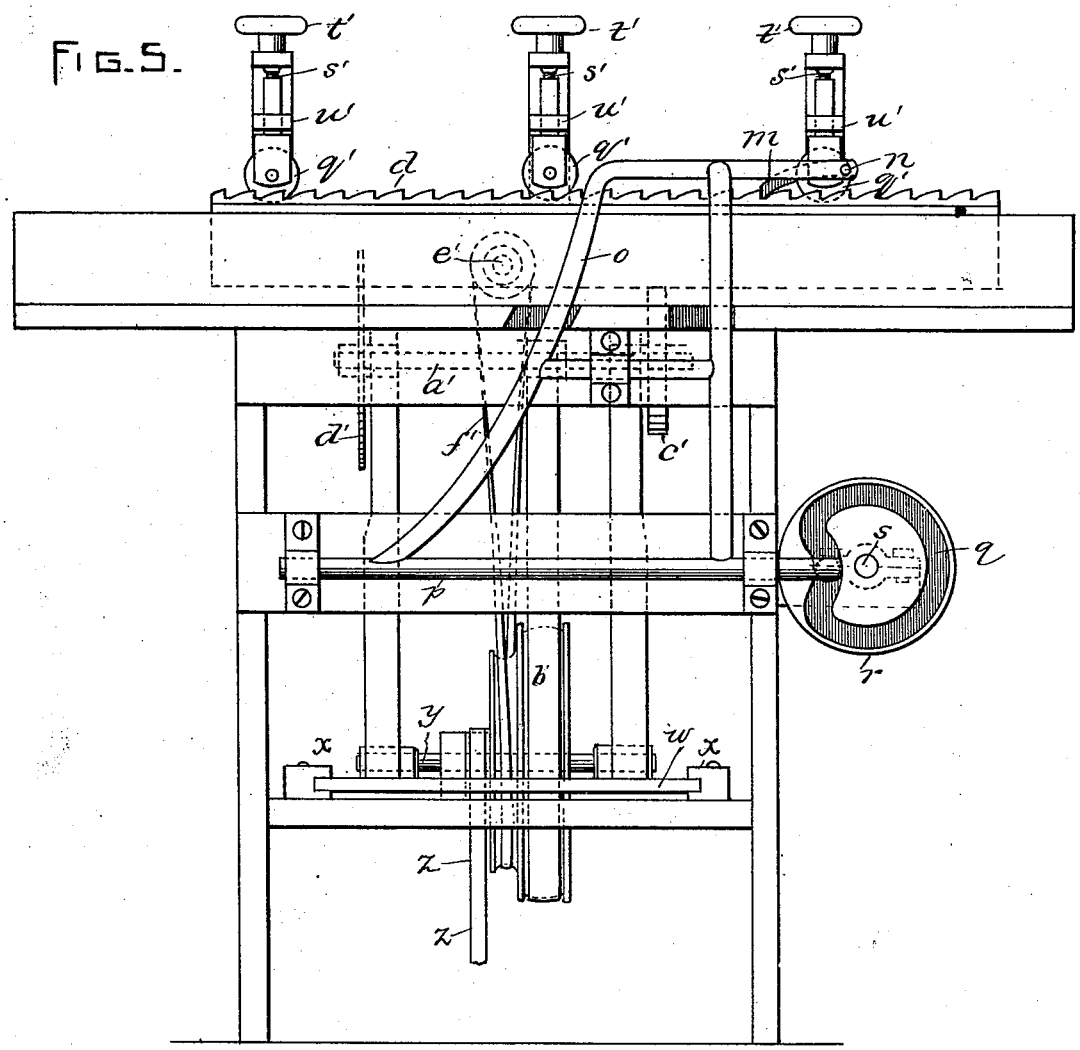
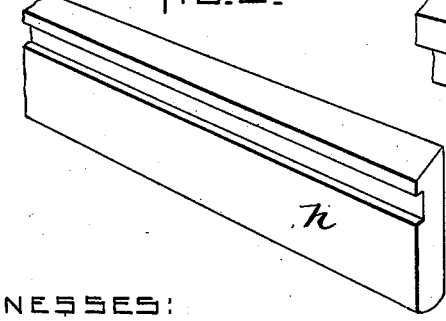
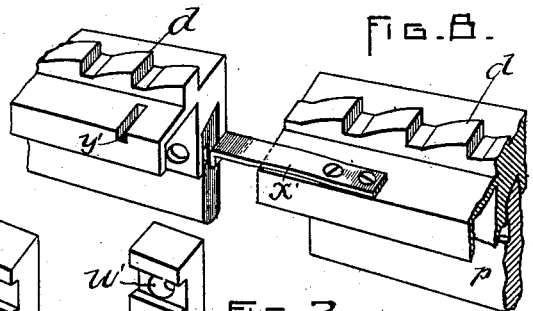
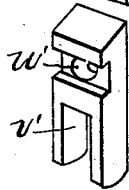
WITNESSES:
N. W. Jackson
H. A. Hall.
INVENTOR:
E. B. Mansfield.
by Mighn, Brown & Crossley
Solicitors

UNITED STATES PATENT OFFICE.

EBEN B. MANSFIELD, OF MAPLEWOOD, MASSACHUSETTS, ASSIGNOR OF ONE-HALF TO FRANK G. KINCAID, OF SAME PLACE.

MACHINE FOR MAKING PARTS OF PIANOFORTE-ACTIONS.

SPECIFICATION forming part of Letters Patent No. 507,020, dated October 17, 1893.

Application filed August 8, 1892. Serial No. 442,415. (No model.)

*To all whom it may concern:*

Be it known that I, EBEN B. MANSFIELD, of Maplewood, in the county of Middlesex and State of Massachusetts, have invented certain new and useful Improvements in Machines for Making Parts of Pianoforte-Actions, of which the following is a specification.

This invention has relation to means for making parts of piano-forte actions; and it has for its object the provision of a machine whereby a strip of molding or properly prepared material may be "grubbed," bored, and sawed off at a single operation, and the strip automatically fed along to the desired extent for another operation, and so on, so that the work can be performed with great expedition, and a great saving of expense.

To these ends the invention consists of the improved machine which I will now proceed to describe and claim, reference being made to the annexed drawings and the letters marked thereon, forming a part of this specification, the same letters designating the same parts or features as the case may be, wherever they occur.

Figure 1:
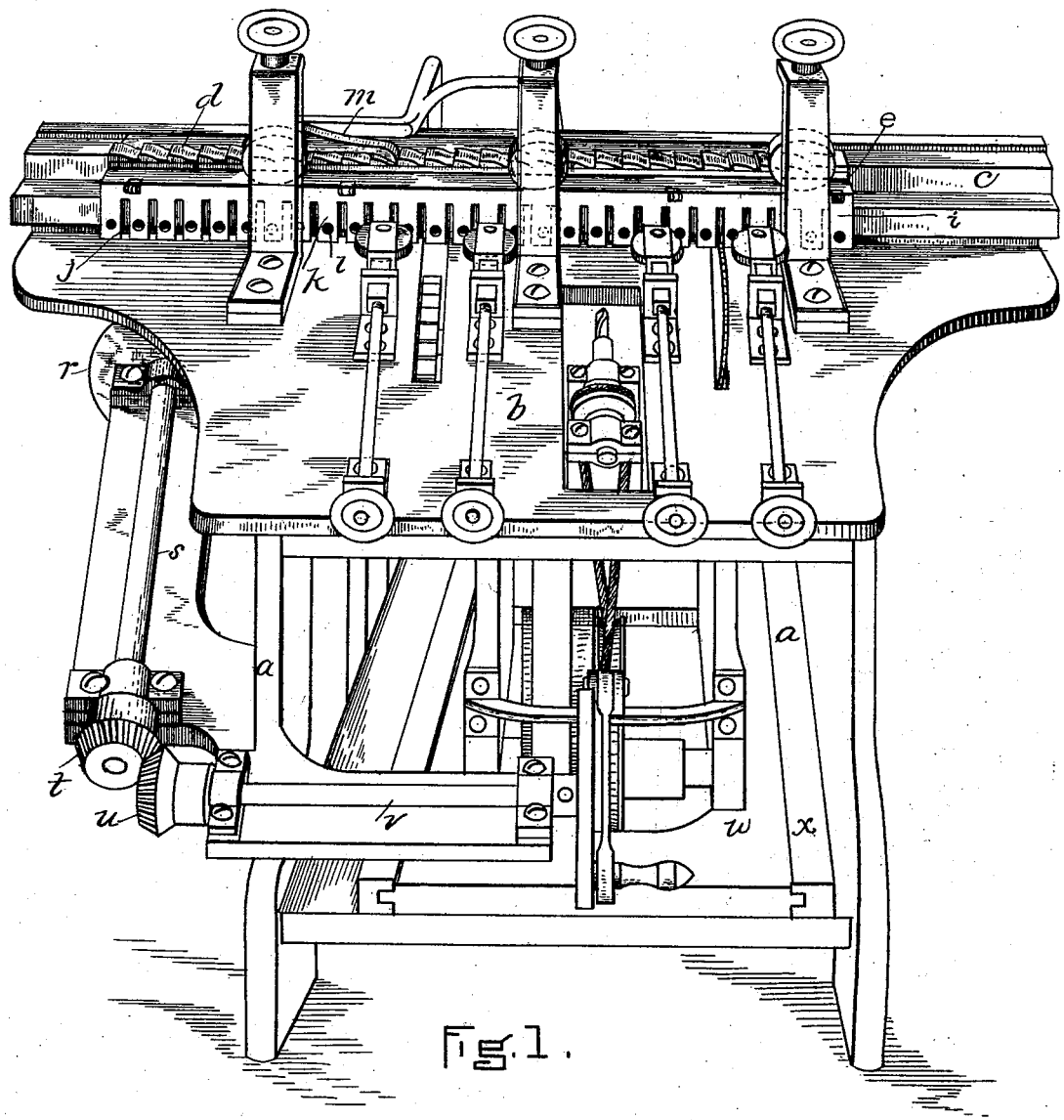
Figure 2:
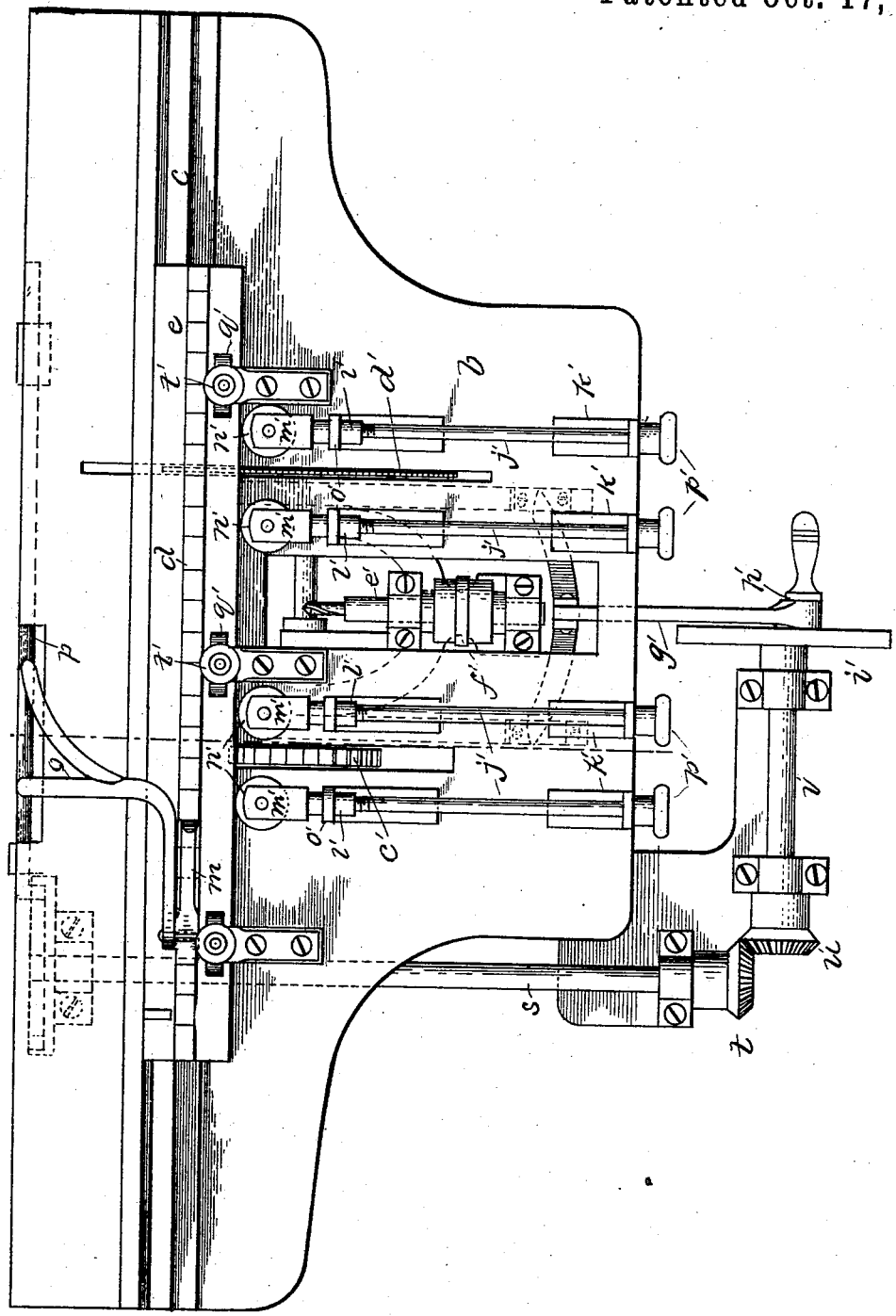
Figure 3:
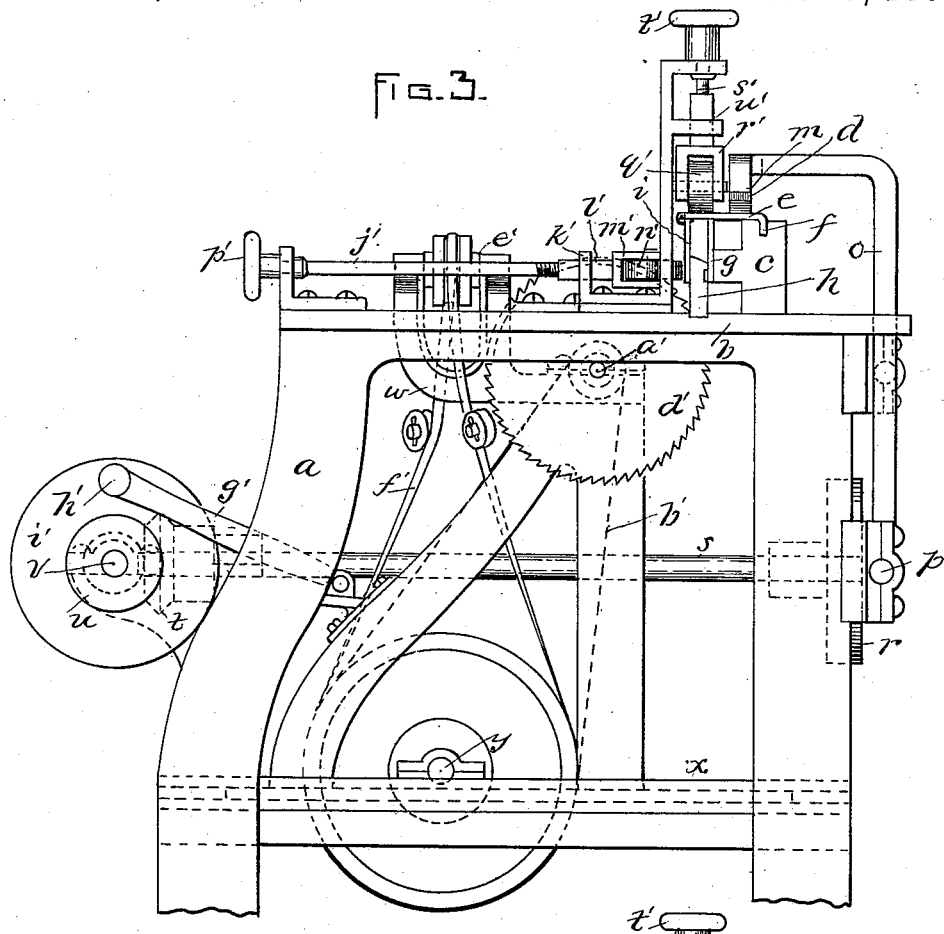
Figure 4:
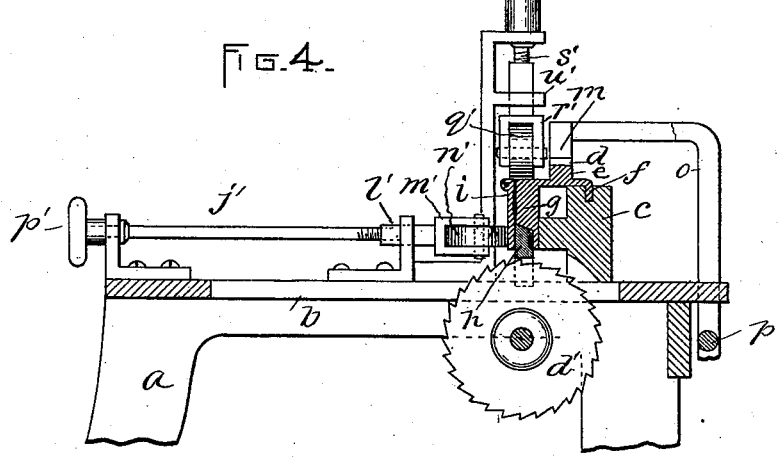

Of the drawings—Figure 1 is a perspective view of the machine complete. Fig. 2 is a top plan view of the same. Fig. 3 is an end elevation. Fig. 4 is a sectional view taken on a line corresponding with the movement of the grub. Fig. 5 is a rear elevation. Fig. 6 is a perspective view of a strip of molding ready to be placed in the machine to be acted upon. Fig. 7 is a perspective view of a part of a pianoforte action made by the machine from a strip of material such as is represented in Fig. 6. Fig. 8 is a perspective view of means which may be employed for coupling carrying racks, so as to obviate the necessity of stopping the machine when a new strip is put in.

In the drawings $a$ designates the frame of the machine which may be of wood or any other suitable material, and of such form and size as will adapt it to support the various parts and suit it to the work to be performed.

$b$ is the bed, upon which is secured a suitable track $c$, which supports and guides the carrying rack, which consists of the toothed bar or rack $d$ secured upon or forming an integral part of a plate $e$ having at its rear edge a flange $f$ which fits in a groove formed in the upper part of the track $c$.

$g$ is a bar depending from the plate $e$, and grooved or otherwise formed in its lower part to receive the upper part of a strip $h$ of suitably formed material, for instance like that shown in Fig. 6.

$i$ is a plate hingedly connected with the upper forward edge of the bar $g$, and adapted to be turned up from and folded down against a strip of material placed in the groove formed in the lower part of the bar $g$. In the present case the plate $i$ is slotted, as at $j$, at regular intervals, so as to form plates or tongues $k$, in which holes $l$ are formed, as shown.

$m$ is a pawl pivoted at $n$ on the angular part of an arm connected with a frame $o$ attached at its lower part to a rod $p$ supported in suitable bearings, which rod at one end is provided with a stud which extends into a cam groove $q$ formed in the side of a disk $r$. The disk $r$ is secured upon a shaft $s$, provided on its opposite end with a miter gear $t$ which is engaged and driven by a similar gear $u$ on a transversely arranged shaft $v$, the latter shaft being driven in any suitable way.

With this construction it will be seen that as the shaft $v$ is rotated it will rotate the shaft $s$ and disk $r$, effecting a reciprocation of the rod $p$, frame $o$, and pawl $m$ and moving the carrying rack intermittingly toward the right as viewed in Fig. 1, the pawl engaging the teeth of the rack $d$ as shown. The teeth of the rack $d$ are of such length or distance apart, and the throw of the rod $p$ is of such extent that the carrying rack will be shogged at each movement to the extent of the distance between two slots $j$ in the plate $i$.

$w$ designates a carriage adapted to be reciprocated on tracks or ways $x$ supported by the frame.

In the carriage $w$ supported in suitable bearings is a shaft $y$ driven by a belt $z$ passing over a pulley on said shaft.

$a'$ is a shaft supported in bearings in the upper part of the carriage $w$ and driven by a belt $b'$ passing around pulleys on the shafts $y$ and $a'$ as shown. Upon the shaft $a'$ are secured at suitable points the grub-saw $c'$ and cutting-off saw $d'$, the latter being so positioned that when the carriage is moved inward it will operate through the slots $j$ in the plate $i$.

$e'$ designates a shaft, arranged at a right angle to the shaft $a'$ and journaled in suitable bearings in the upper part of the carriage, the said shaft $e'$ having its inner end constructed as or provided with a boring tool, so arranged that when the carriage is moved inward it will operate through one of the holes $l$ of the tongues $k$ of plate $i$. The shaft $e'$ is driven by means of a belt $f'$ passing over pulleys on the said shaft $e'$ and shaft $y$.

$g'$ designates a pitman connected at one end with a crank-pin $h'$ projecting laterally from the disk or wheel $i'$ on the shaft $v$, and pivoted at the other end to the carriage, whereby the latter is reciprocated.

$j'$ are rods supported so as that they may turn but not move longitudinally in brackets $k'$ attached to the bed $b$. The said rods at their inner ends have a screw-thread connection with the squared shanks $l'$ of the yokes or forks $m'$ in which are journaled rollers $n'$ having rubber-covered or yielding peripheries. The said shanks $l'$ are supported so as to move longitudinally but so as not to turn in the bracket $k'$ in which they have their bearings, so that by turning the rods $j'$ which may be accomplished by means of the hand wheels $p'$ on their outer ends, the wheels or rollers $n'$ may be set up and be made to bear against the plate $i$ with more or less force.

$q'$ are rollers or wheels similar to rollers $n'$, journaled in yokes $r'$, adapted to be adjusted by means of rods $s'$ and hand-wheels $t'$ so as to bear with greater or less force on the plate $e$ over the bar $g$. The yokes $r'$ and rods $s'$ are supported in bearings in the brackets $u'$ extending up from the bed $b$.

In the use of the invention, supposing parts of piano-forte actions like that shown in Fig. 7 are to be made, a strip of material of the form of that shown in Fig. 6 may be placed in the groove formed in the lower part of the bar $g$, and the plate $i$ folded down against the front side of the same. The yokes $m'$ and $r'$ will then be adjusted so as to make the rollers $n'$ $q'$ bear respectively on the plates $i$ and $e$, and the machine set in motion. As the carriage moves forward the saw $c'$ will operate to grub out the notch $v'$, and the boring tool operating through one of the holes $k$ in the plate $i$ will bore the hole $w'$, and the saw $d$ running in one of the grooves $j$ will cut off a piece or part like that shown in Fig. 7. Upon the backward run of the carriage, the pawl $m$ will act to feed the carrier rack forward to the extent of one tooth of the rack $d$ and the operations described will be repeated, and in this way a piece or part like that shown in Fig. 7 may be made at each forward or inward run of the carriage. As a carrier rack moves forward another containing a strip of material may be placed on the track $c$ and connected with the carrier first mentioned by means of a spring latch $x'$ on one carrier engaging a notch $y'$ on the other, as shown in Fig. 8; or any other suitable means may be employed for connecting the carriers.

By providing the carriage with tools differently formed from those herein shown other parts of piano-forte actions may be made by the machine.

I do not confine myself to the precise form of means shown for bearing upon the carrier of the material, since any means performing the same functions as the rollers $n'$ $q'$ will answer the purpose as well.

I claim—

1. A machine for forming parts of pianoforte actions, comprising in its construction a work-carrier means for moving said carrier step-by-step in the direction of its length, a tool-carriage adapted to be reciprocated at right angles to the line of movement of the work-carrier, a shaft journaled in bearings on said carriage, and carrying rotary cutters, said shaft extending parallel with the work-carrier, a shaft journaled in bearings on the tool-carriage and extending at right angles to the first named shaft and carrying a boring tool, suitable means for driving the two shafts, and mechanism for reciprocating the tool carriage and operating the work-carrier.

2. A machine for forming parts of pianoforte actions, comprising in its construction a work-carrier means for moving said carrier step-by-step in the direction of its length and having a groove to receive the work, and one side of the groove provided with a series of slots between which are tongues provided with holes, and a reciprocating tool carriage carrying a cutter to work through said slots and a boring tool arranged to work through the holes in the tongue between said slots.

3. A machine for forming parts of pianoforte actions comprising in its construction a work-carrier means for moving said carrier step-by-step in the direction of its length and having a groove to receive the work, one side of the groove being hinged, adjustable bearing pieces to act against said hinged side, a reciprocating tool carriage carrying tools to act on the work and means for driving the tools.

In testimony whereof I have signed my name to this specification, in the presence of two subscribing witnesses, this 23d day of July, A. D. 1892.

EBEN B. MANSFIELD.

Witnesses:
  ARTHUR W. CROSSLEY,
  M. W. JACKSON.